United States Patent [19]

Saegusa et al.

[11] Patent Number: 4,465,369

[45] Date of Patent: Aug. 14, 1984

[54] LIGHT MEASURING DEVICE

[75] Inventors: Takashi Saegusa, Sagamihara; Osamu Maida, Tokyo, both of Japan

[73] Assignee: Nippon Kogaku K.K., Tokyo, Japan

[21] Appl. No.: 301,814

[22] Filed: Sep. 11, 1981

[30] Foreign Application Priority Data

Sep. 19, 1980 [JP] Japan .............................. 55-130525

[51] Int. Cl.³ .............................................. G01J 1/42
[52] U.S. Cl. .................................... 356/222; 354/432; 250/209
[58] Field of Search ................ 356/222, 218; 250/209; 354/23 D, 31, 434, 433, 437, 432

[56] References Cited

U.S. PATENT DOCUMENTS 4,092,652  5/1978  Ito et al. .......................... 354/23 D
4,251,804  2/1981  Schardina et al. ...... 340/347 AD X
4,309,091  1/1982  Fukuhara et al. .............. 356/222 X

OTHER PUBLICATIONS

Barnes, "Improve Single-slope A/D Accuracy", Electronic Design 2, Jan. 18, 1973, pp. 58-62.

*Primary Examiner*—Vincent P. McGraw
*Assistant Examiner*—L. A. Dietert
*Attorney, Agent, or Firm*—Shapiro and Shapiro

[57] ABSTRACT

A simplified multi-light measuring device in a photographic system capable of measuring an object field divided into plural areas. The device comprises register means (e.g. 100-500) comprising plural registers for storing plural photoelectric output signals from the plural areas as digital data; reference output generating means (e.g. 60) for generating a reference output signal for determining digital data to be stored in the register means; comparator means (e.g. 21-25) for comparing each of the plural photoelectric output signals with the reference output signal and providing a corresponding output signal; and retaining means for retaining, in response to the output signal from the comparator means, digital data stored in a corresponding register of the register means.

8 Claims, 19 Drawing Figures

LIGHT MEASURING DEVICE

BACKGROUND OF THE INVENTION

1. Field of the Invention

The present invention relates to a device for measuring the luminance of an object, and more particularly to such light measuring device in which the light measurement is conducted for an object field divided into plural areas.

2. Description of the Prior Art

The light measuring device as mentioned above enables exact luminance measurement for each divided area of the object, and is therefore advantageous, in the application for photograph taking, in providing an appropriate exposure for the target object even under special illuminating conditions such as a back-illuminated or spot-illuminated object if the exposure is controlled in response to the output of light measurement of a particular divided area in the object field. However, in order to identify the situation of the object field and to provide the appropriate exposure for the target object according to the absolute or relative levels of plural outputs corresponding to different divided areas, there is essentially preferred digital signal processing to analog processing for the purpose of various conditional judgement. For this purpose there is required conversion of analog data obtained from plural photosensor elements into digital data, and such multiple conversion has necessitated the use of a complicated structure.

SUMMARY OF THE INVENTION

The object of the present invention is to provide a light measuring device not having with the aforementioned drawback and capable of achieving analog-digital conversion of the photoelectric output signals of plural photosensor elements by means of a simple structure.

BRIEF DESCRIPTION OF THE DRAWINGS

FIG. 4 comprising

FIG. 6 comprising

FIG. 7 comprising

DETAILED DESCRIPTION OF THE PREFERRED EMBODIMENTS

Now the present invention will be clarified in detail by an embodiment thereof applied in a photographic camera.

Figure 1:
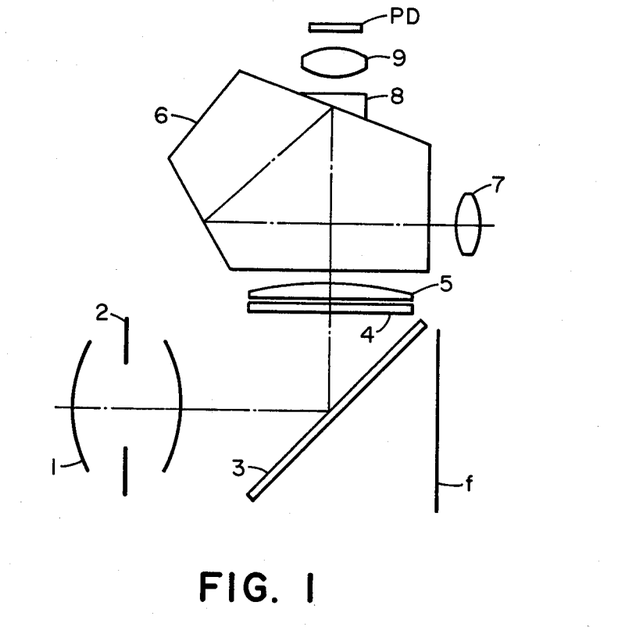
FIG. 1 is a schematic view of a light measuring system in a photographic camera.
Figure 2:
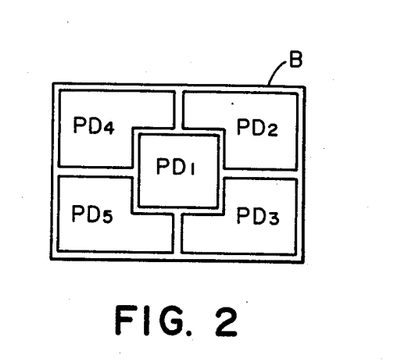
FIG. 2 is a plan view showing a photosensitive area pattern of photosensor elements to be employed in an embodiment of the present invention.

FIG. 1 shows, in a schematic view, a light measuring system incorporated in a single-lens reflex camera, wherein the light beam from an object is guided through a picturetaking lens 1 and a diaphragm 2 and focused on a focusing plate 4 after reflected by a mirror 3. The object image thus focused is observed through a condenser lens 5, a pentagonal roof prism 6 and an eye-piece 7. Also the object image on the focusing plate 4 is focused again on a photosensitive face of a photosensor device PD through a prism 8 adhered on a roof face of said pentagonal roof prism 6 and a relay lens 9. Said photosensor device PD is provided, according to the pattern as shown in FIG. 2, with a photosensor element PD1 for measuring the central area of the object field, photosensor elements PD2, PD3 for measuring the upper areas of the object field, and photosensor elements PD4, PD5 for measuring the lower areas of the object field.

Figure 3:
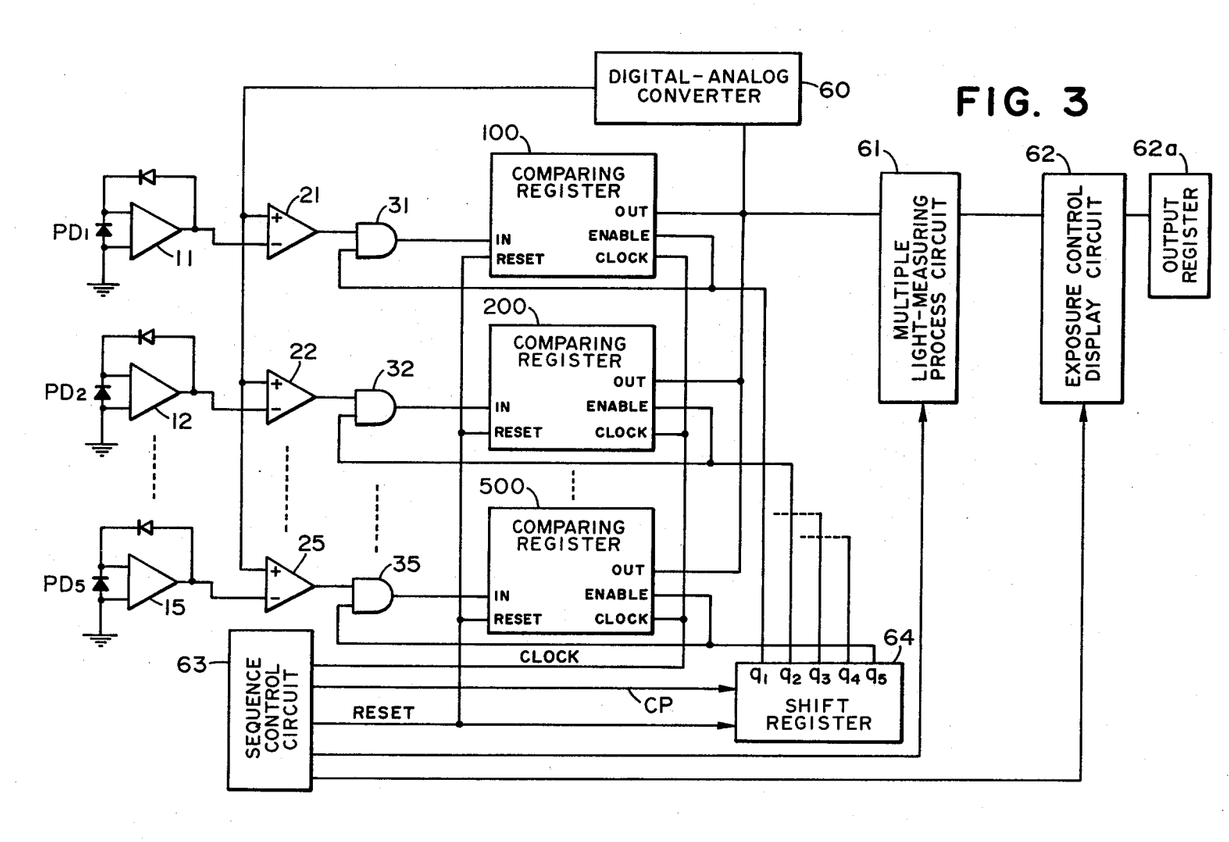
FIG. 3 is a block diagram of a first embodiment of the present invention.

FIG. 3 shows an embodiment of the present invention in a block diagram, wherein head amplifier circuits 11–15 respectively connected to the above-mentioned photosensor elements PD1–PD5 provide output signals corresponding to the measured light after logarithmic compression. Comparators 21–25, provided respectively corresponding to said head amplifiers, compare said output signals with the output signal from a digital-analog converter 60.

AND gates 31–35 are provided respectively corresponding to said comparators 21–25 and are sequentially selected by the output signal of a shift register 64 to transmit the output signals of said comparators 21–25 to successive comparing registers 100–500. The timing of various functions is controlled by a sequence control circuit 63.

At an initial timing of the light measuring cycle the sequence control circuit 63 releases a reset pulse RESET to reset the registers 100–500 and the shift register 64, whereby the output q1–q5 thereof assume the following logic states:

$$q1="1", q2=q3=q4=q5="0" \quad (1)$$

In this manner the register 100, receiving a signal "1" at the enable port thereof, is functionally connected with the digital-analog converter 60.

Also the AND gate 31 is opened to transmit the output signal of the comparator 21 to the input port of the register 100, which changes the uppermost digit thereof to "1" in response to a clock pulse CLOCK after being reset by the sequence control circuit 63, whereby the digital-analog converter 60 releases an analog output signal corresponding to a binary code "1000" which is compared by the comparator 21 with the output from the head amplifier 11. In case the output of said digital-analog converter 60 is larger, the comparator 21 supplies a signal "1" to the register 100 which thus resets the signal "1" at the uppermost digit and changes the next digit to "1" in response to a second clock pulse received from the sequence control circuit 63, whereby the digital-analog converter 60 releases an analog output signal corresponding to a binary code "0100" for conducting similar comparison. In case the output of said digital-analog converter 60 is smaller, the comparator 21 releases an output signal "0" to retain the signal "1" in said register 100. Thereafter the comparison is continued in a similar manner to the lower most digit, and the photoelectric output signal from the photosensor element PD1 is thus stored in the register 100 in an analog-digital converted form.

After the completion of the successive comparison by the register 100, the sequence control circuit 63 releases a control pulse CP to the shift register 64, whereby the outputs thereof are shifted to the following states:

$$q2 = \text{"1"}, q3 = q4 = q5 = q1 = \text{"0"} \tag{2}$$

In this manner the successive comparing register 200 receives a signal "1" at the enable port thereof and supplies signals to the digital-analog converter 60. Also the AND gate 32 is opened to transmit the output signal from the comparator 22 to said register 200.

The register 200, functioning in the same manner as the aforementioned register 100, stores the photoelectric output signal of the photosensor element PD2 in the analog-digital converted form. Thereafter the photoelectric output signals from the photosensor elements up to PD5 are similarly converted into digital form and stored in the successive comparing registers up to 500.

Upon completion of all the successive comparison functions the sequence control circuit 63 discontinues the supply of clock pulses to the register 100-500, whereby the output signals thereof remain constant regardless of the change in the photoelectric output signals. Also the sequence control circuit 63 supplies high-speed control pulses when needed to the shift register to change output signals q1-q5 thereof to "1" in successive manner thereby supplying the analog-digital converted photoelectric output information stored in said registers 100-500 to a multiple light-measuring process circuit 61 in successive manner. In this manner said registers 100-500 function as final memories for the photoelectric output signals. Also it is to be noted that the above-mentioned transfer of photoelectric output information from the registers 100-500 to the process circuit 61 can be arbitrarily repeated by the sequence control circuit 63, since the registers 100-500 retain the stored data due to the absence of clock pulses entering the clock input ports thereof. Thus the data transfer is conducted each time for the computation of the maximum, average and/or minimum value of the photoelectric output signals by said process circuit 61. A known exposure control display circuit 62 is provided for conducting processing necessary for exposure control and display in combination with other exposure factors supplied from the sequence control circuit 63 and to store the result of exposure control calculation in an exposure control output register 62a. After said processing the sequence control circuit 63 again enters the light measuring sequence by releasing clock pulses to the successive comparing registers as already explained in the foregoing. Also when the shutter releasing function is initiated, the exposure control display circuit 62 immediately performs exposure control according to the data stored in said output register 62a.

The function of the aforementioned multiple light-measuring process circuit 61 for generating multiple output is already disclosed in detail for example in the U.S. Pat. No. 4,214,826 and the Japanese Patent Laid-Open No. 52419/1978. In summary, as disclosed in the former reference, the circuit detects a maximum value Pmax and a minimum value Pmin from the measured output signals, calculates Pmax−Pmin, identifies the object as not having excessive luminance distribution (an ordinary object) in case of Pmax−Pmin≦δ or as having a large luminance distribution (a specially situated objected such as back-illuminated) in case of Pmax−Pmin≧δ, and releases an average value Pmean of the measured output signals in the former case or the maximum value Pmax or minimum value Pmin in the latter case according to the identification if the object has a bright background such as a person illuminated from the back or the object has a dark background such as a person illuminated by a spot-light. The background is identified by the comparison of a center value of the maximum and minimum of plural measured output signals (i.e. (Pmax+Pmin)/2) and the mean value Pmean of said plural signals, and is identified as dark or bright respectively when the former is larger or smaller than the latter.

The above-explained multiple process circuit 61 is featured by the fact that the optimum output signal is obtained by the processing of plural photoelectric output signals according to a predetermined program.

A similar circuit is disclosed also in the U.S. patent application Ser. No. 123,209 corresponding to the German Patent Application No. P.3,007,575 of the present applicant.

Figure 4:
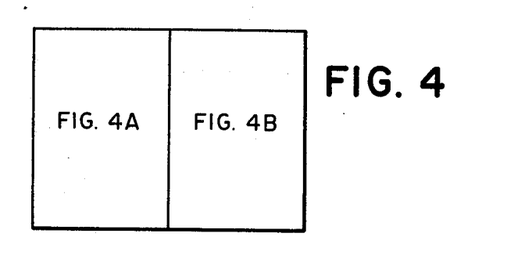
Figure 4A:
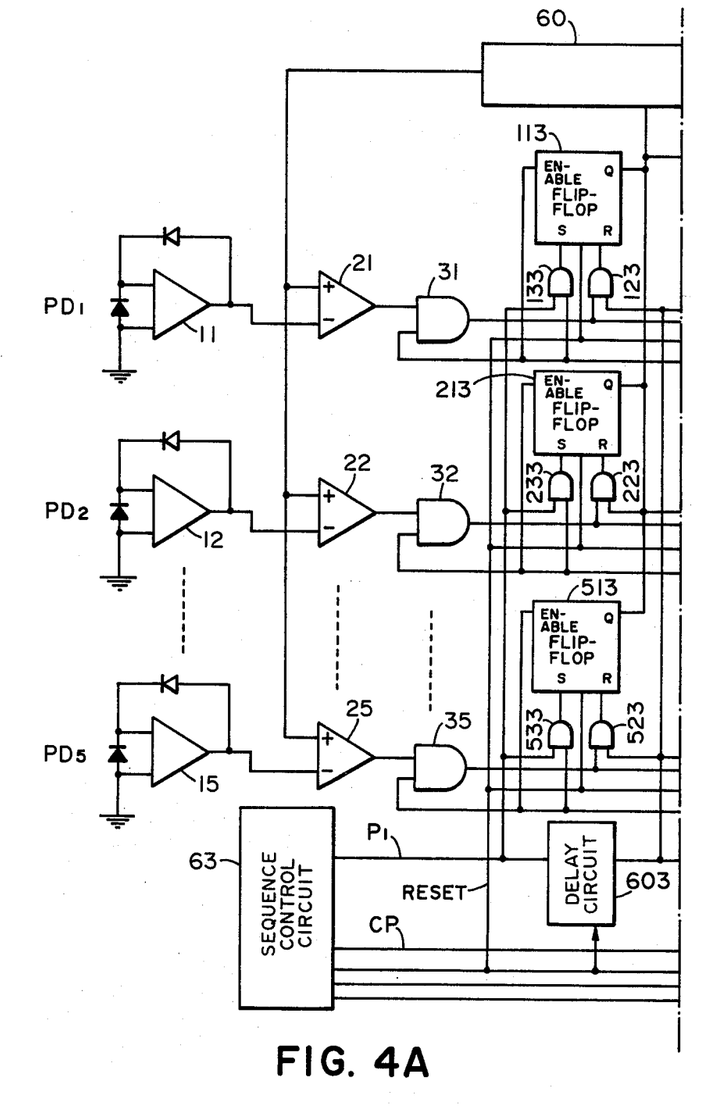
FIGS. 4A and 4B is a detailed circuit diagram of the first embodiment of the present invention.
Figure 4B:
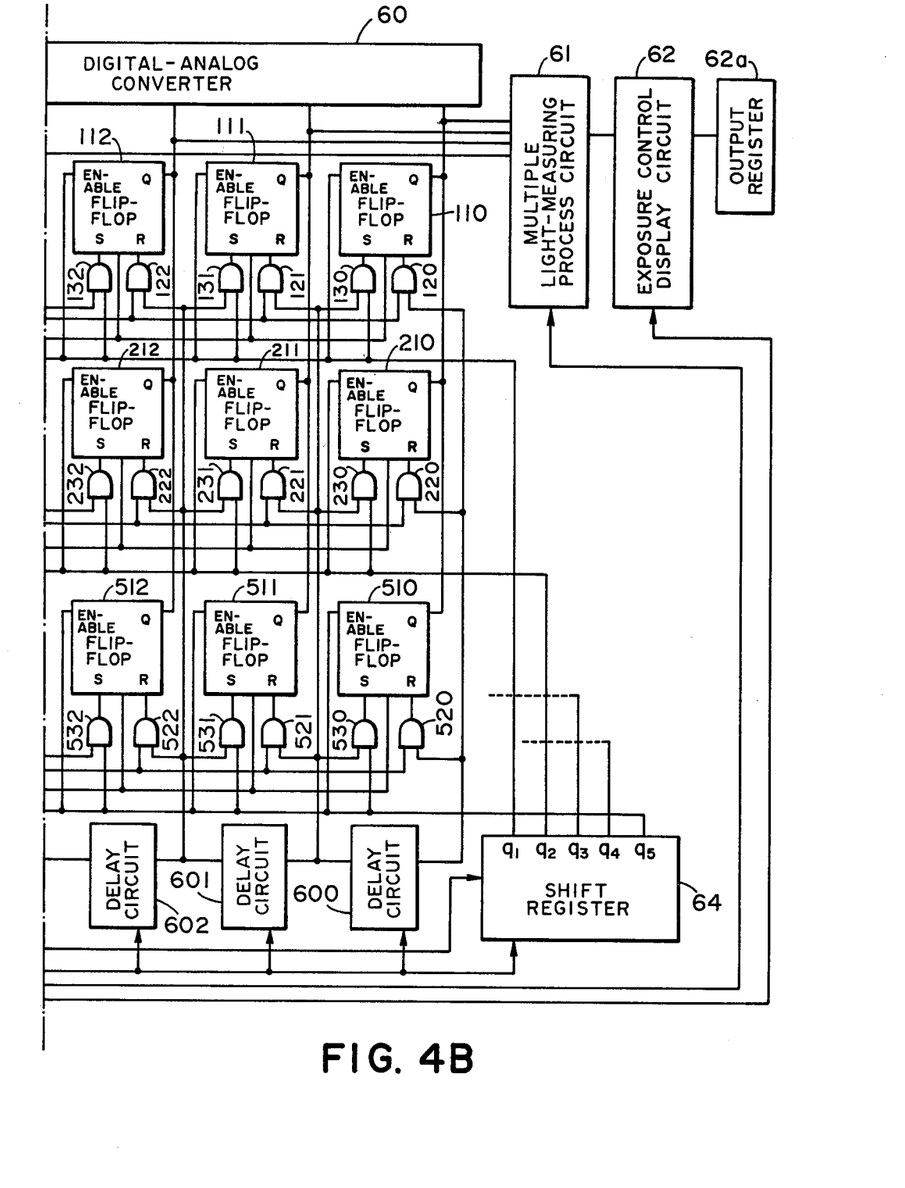

Now reference is made to FIGS. 4A and 4B showing the details of the successive comparing registers 100-500 outlined in FIG. 3.

Said 4-bit registers 100-500 are composed of cascade-connected flip-flops 113-110, 213-210, ..., 513-510, AND gates 133-130, 233-230, ..., 533-530 connected to set input ports S of said flip-flops; AND gates 123-120, 223-220, ..., 523-520 connected to reset input ports R of said flip-flops; and delay circuits 603-600, whereby each cascade-connected set of four flip-flops provides 4-bit parallel binary code.

In the function of the above-explained circuit, the sequence control circuit 63 at first releases a reset pulse RESET which is supplied to other reset ports of the flip-flops 113-110, 213-210, ..., 513-510 to shift all the output signals thereof to "0". At the same time the delay circuits 603-600 and shift register 64 are reset to obtain output signals therefrom as indicated by the aforementioned condition (1), thus achieving a light measurement stand-by state. Thus the AND gate 31 is opened to enable transfer of the output signal from the comparator 21 to the successive comparing register. Successively a first pulse P1 is supplied from the sequence control circuit 63 to the delay circuit 603 and to the AND gates 133, 233, ..., 533. However, because of the condition (1), the AND gate 133 alone releases a signal "1" to provide a signal Q="1" from the flip-flop 113, thus initiating the light measuring cycle. As the shift register 64 provides a signal q1="1" to the enable ports of the flip-flops 113-110, the digital-analog converter 60 is controlled by the output signals of said flip-flops. In this state the flip-flops 112-110 are in the reset state to provide output signals "0". Consequently the digital-analog converter 60 provides an analog signal corresponding to a binary code "1000" to the non-inverted input port of the comparator 21. In case the output signal of the digital-analog converter 60 is larger, the comparator 21 provides a signal "1" to cause the AND gate 31 to release a signal "1". After a period t₀, the delay circuit 603 supplies a pulse to the circuit 602, whereby the AND gate 123 releases a signal "1" to reset the flip-flop 113. At the same time the AND gate 132 releases a signal "1" to set the flip-flop 112. In this manner the digital-analog converter 60 releases an analog signal corresponding to a binary code "0100", and the comparator 21 compares said signal with the output signal from the head amplifier 11. In case the latter is larger, the comparator and thus the AND gate 31 release signals "0", and after a period $2 \times t_0$ the delay circuit 602 releases a pulse to the circuit 601 to shift the output signal of the AND gate 122 to "0" whereby the flip-flop 112 is not reset. However the AND gate 131 releases an output signal "1" to set the flip-flop 111, whereby the digital-analog converter 60 supplies an analog signal corresponding to a binary code "0110" to the comparator 21. The procedure is thereafter repeated in a similar manner.

After a period $4 \times t_0$, the flip-flops 113-110 constituting a row store the photoelectric output signal from the photosensor element PD1 in a digitalized form, and the sequence control circuit 63 releases a pulse to step advance the shift register 64 to release the output signals as specified in the aforementioned condition (2). In this manner the enable ports of the flip-flops 213-210 are shifted to the level "1" to functionally connect said flip-flops with the digital-analog converter 60, and the AND gate 32 is opened to enable transfer of the output signal from the comparator 22 to the successive comparing register 200. The sequence control circuit 63 again releases a pulse to repeat the procedure mentioned in the foregoing, thereby storing the photoelectric output signal of the photosensor element PD2 in the flip-flops 213-210 in a digitalized form.

Thus, upon completion of the analog-digital conversion for each photosensor element, the sequence control circuit 63 releases a control pulse to bring the output signal q3, q4 and q5 in succession to the level "1" thereby storing the photoelectric output signals of the photosensor elements PD3, PD4 and PD5 in digital form respectively in the flip-flops 313-310, . . . , 513-510.

Upon completion of all the analog-digital conversion, the sequence control circuit 63 terminates the supply of clock pulses to maintain the flip-flops 113-110, 213-210, . . . , 513-510 intact from the output signal of the AND gates 31-35, and supplies high-speed control pulses to the control input port of the shift register 64 when needed to bring the output signals q1-q5 thereof to the level "1" in succession thereby guiding the photoelectric output signals stored in the shift registers 113-110, . . . , 513-510 in successive order to the multiple light-measuring process circuit 61. The subsequent procedure is the same as already explained in relation to FIG. 3.

Figure 5A:
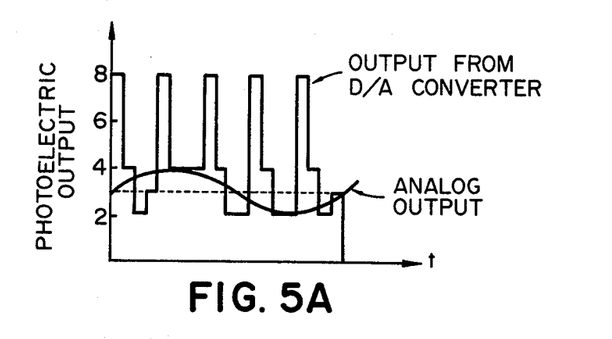
FIGS. 5A and 5B are waveform charts showing the relation between a commercial frequency and photoelectric output signal.

The light measurement of an object field under artificial illumination generally shows change in photoelectric output synchronized with the commercial frequency, and such change can be prevented by providing the photosensor element with a low-pass filter. In case plural photosensor elements are in use, however, it is practically not possible to employ the low-pass filters of corresponding number. This defect can nevertheless be prevented by synchronizing the scanning time in light measurement with the commercial frequency as represented in FIG. 5A, showing the photoelectric output in ordinate as a function of time in abscissa.

Figure 5B:
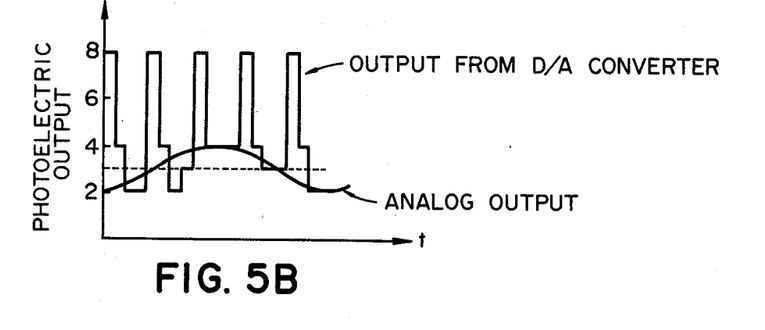

If the measurement is made on a field of uniform luminance in order to see the effect of the commercial frequency, each analog output of five photosensor elements becomes synchronized with the commercial frequency. Thus, by conducting five analog-digital conversions by the flip-flops in a period of one wavelength, the digital-analog converter 60 provides the output signals as shown in FIG. 5A with five analog-digital outputs for binary codes "0011", "0100", "0010", "0010" and "0011" with an average "0011" which is equal to the average value of the analog output, whereby the influence of the commercial frequency can be almost completely eliminated as far as the average value Pmean is concerned. In practice the phase relationship may become displaced as shown in FIG. 5B but the result obtained is equivalent to the case explained above.

The above-mentioned method is practically valuable as the multiple light-measuring process circuit 61 usually selects the average value Pmean as the appropriate exposure.

Also a similar effect can be evidently expected if the total light-measuring time is selected equal to a multiple of the wavelength period of the commercial frequency.

Figure 6:
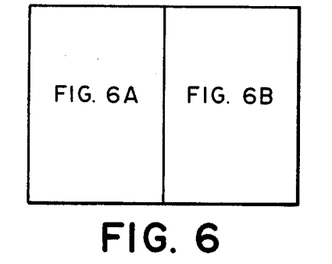
Figure 6A:
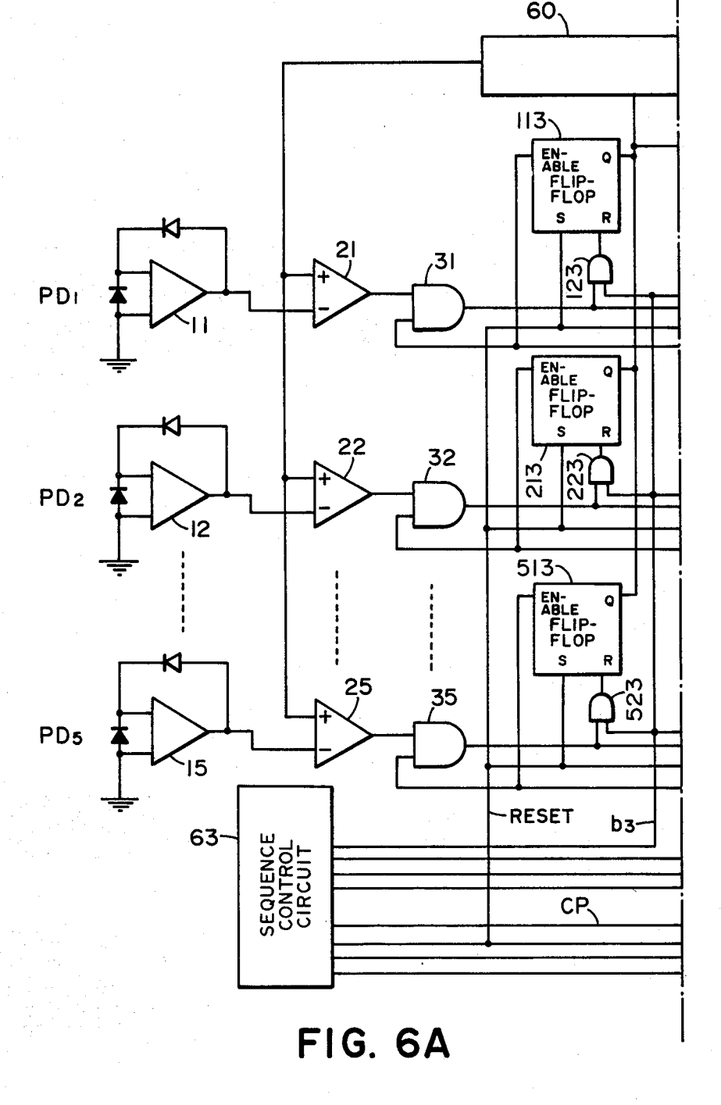
FIGS. 6A and 6B is a circuit diagram of a second embodiment of the present invention.
Figure 6B:
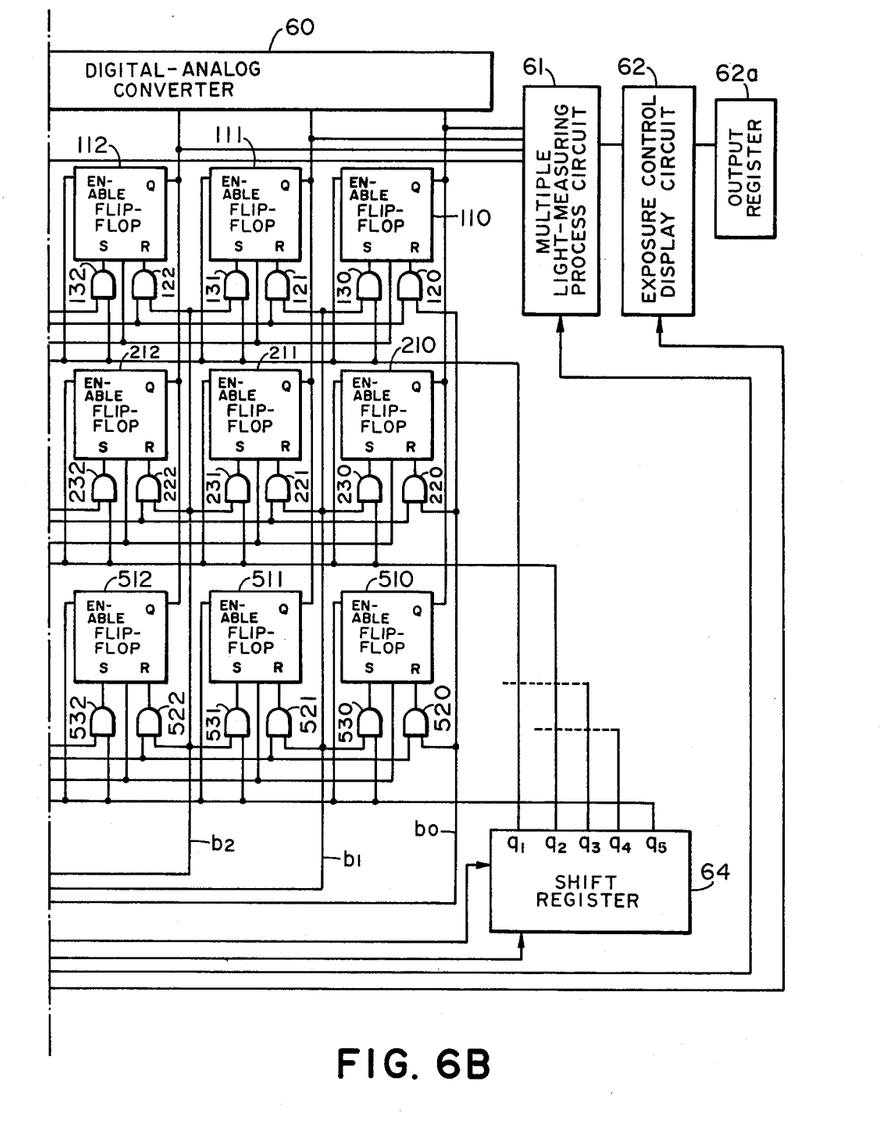

FIG. 6 shows another embodiment of the present invention which is basically different in scanning method from the embodiment shown in FIG. 4.

In this embodiment, the reset pulse RESET from the sequence control circuit 63 sets the flip-flops 113, 213, . . . , 513 in the vertical column and resets other flip-flops 112-110, 212-210, . . . , 512-510, thus setting each horizontal row of flip-flops to a binary code "1000" as the initial value of the photoelectric output. At the same time the shift register 64 is reset to the aforementioned condition (1), thus enabling the flip-flops 113-110 to control the digital-analog converter 60.

After a period $t_0$ required for stabilization of said digital-analog converter 60, the sequence control circuit 63 generates a short pulse b3="1", whereby, in case the output signal from the head amplifier 11 is smaller than that of the digital-analog converter 60, the comparator 21 and the AND gates 31, 123 and 132 release output signals "1" to reset the flip-flop 113 and to set the flip-flop 112. In this manner a binary code "0100" is memorized in the flip-flops 113-110.

Subsequently the sequence control circuit 63 releases a control pulse to shift the shift register 64 to the condition (2) thereby enabling the flip-flops 213-210 to control the digital-analog converter 60.

After a period $t_0$ the sequence control circuit 63 generates a short pulse b3="1", whereby, in case the output signal of the head amplifier 12 is larger than that of said digital-analog converter 60, the comparator 22 and the AND gates 32 and 223 release output signals "0" not resetting the flip-flop 213, while the AND gate 232 releases an output signal "1" to set the flip-flop 212. In this manner a binary code "1100" is stored in the horizontal row of flip-flops 213-210.

Thereafter the shift register 64 is similarly step advanced after a period $t_0$ to continue the comparing procedure down to the head amplifier 15.

Upon completion of the setting and resetting of the vertical column of flip-flops 113, 213, . . . , 513, the shift register 64 is again shifted to the state of the condition (1) by a control pulse, whereby the digital-analog converter 60 is controlled by the binary code output "0100" from the flip-flops 113-110. The sequence control circuit 63 releases a short pulse b2="1" after a period $t_0$, and, if the output signal from the head amplifier 11 is larger than that from said digital-analog converter 60, the flip-flop 112 remains not reset while the AND gate 131 releases an output signal "1" to set the flip-flop 111.

In this manner a binary code "0110" is stored in the flip-flops 113-110.

Subsequently the shift register 64 releases a signal q2="1", whereby the flip-flop 212 is controlled after a period $t_0$ according to the comparison of the output signal of the head amplifier 12 with that of the digital-analog converter 60. Thereafter the flip-flops 312, 412 and 512 are controlled according to the output signals from remaining head amplifiers.

Then the shift register 64 again assumes the state of condition (1), and the same procedure is repeated until the flip-flops 111, 211, . . . , 511, 110, 210, . . . , 510 are all controlled.

The above-explained process is advantageous in maintaining a constant relationship between the photoelectric output signals of corresponding bits of different areas even in case of luminance change, thus being capable of rapidly responding to the change in luminance, because the setting or resetting of the flip-flops of a corresponding bit (i.e. the flip-flops in a vertical column) is conducted in a shorter time in achieving analog-digital conversion for plural photosensor elements. This advantage is significant because the difference in luminance, Pmax—Pmin, is an inportant judging factor for the process circuit 61.

Figure 7:
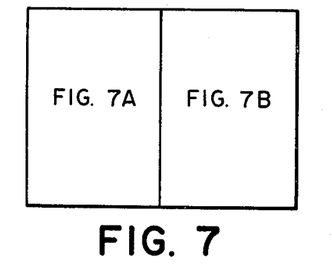
Figure 7A:
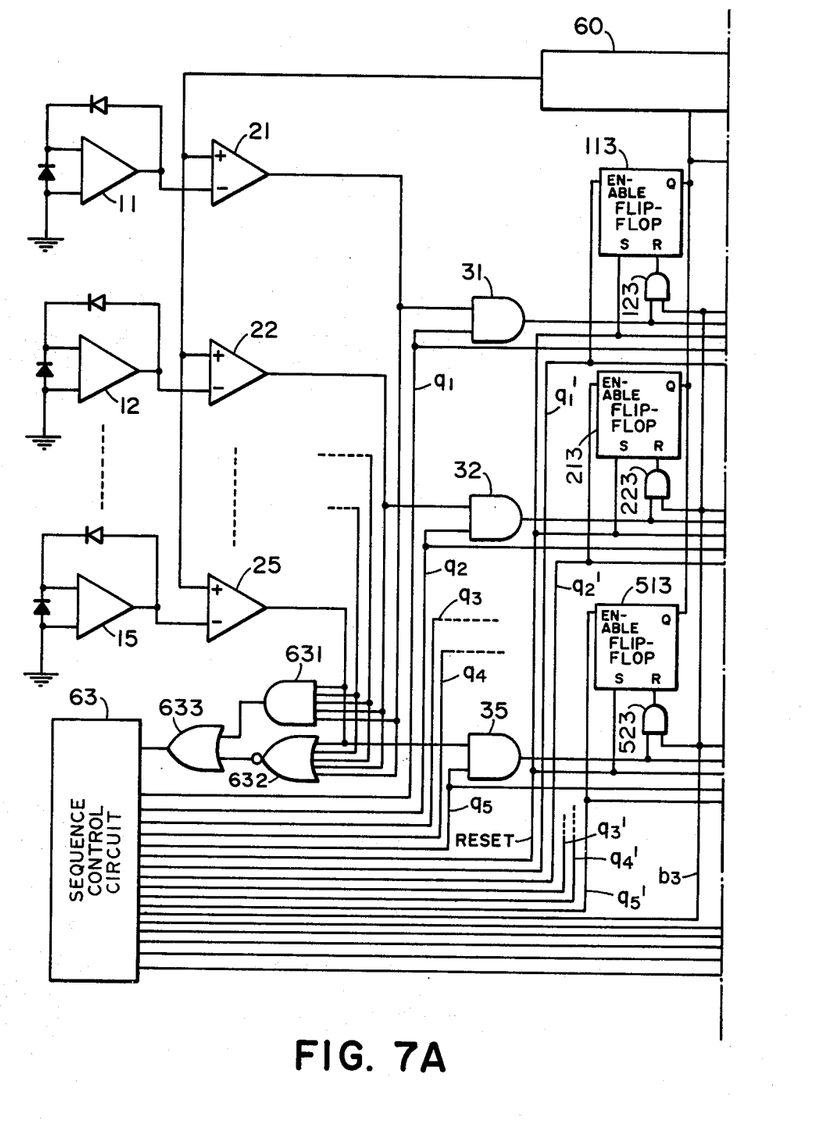
FIGS. 7A and 7B is a circuit diagram of a third embodiment of the present invention.
Figure 7B:
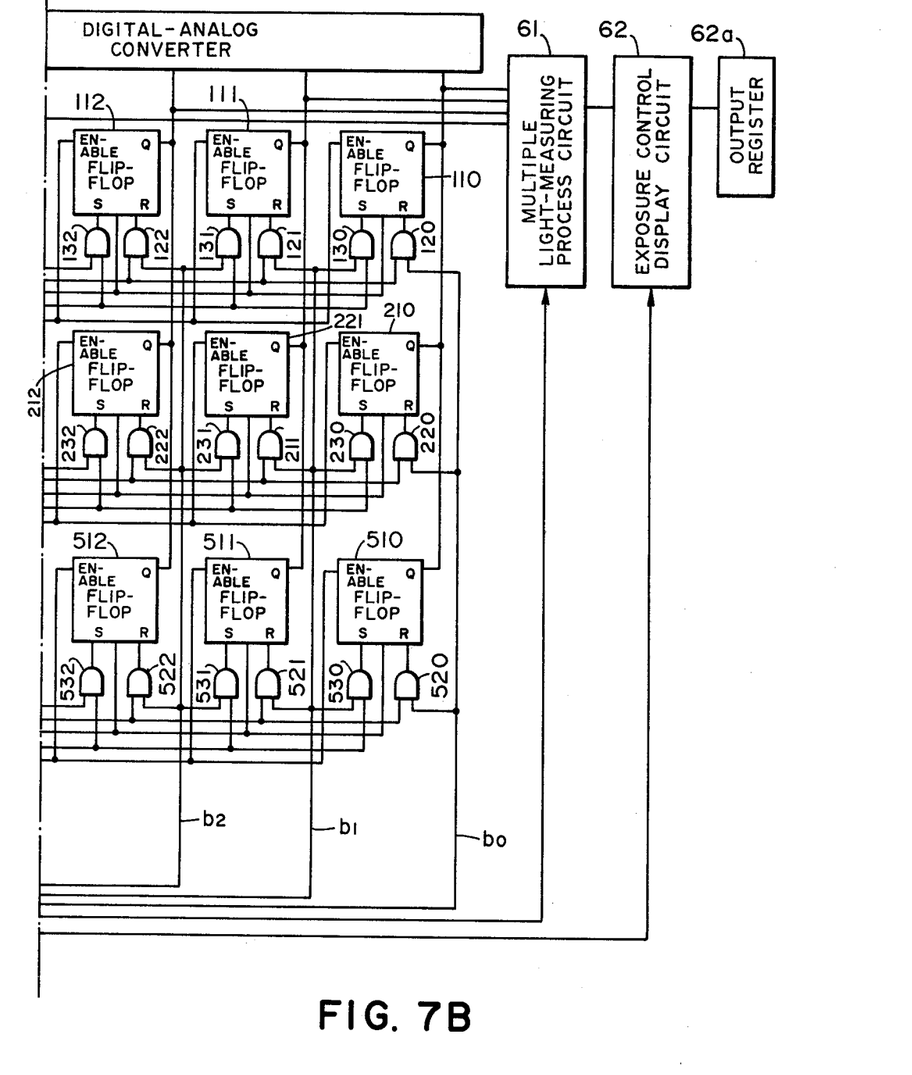

FIG. 7 shows another embodiment improved over the one shown in FIG. 6, wherein the output signals from the comparators 21-25 are supplied to an AND gate 631 and a NOR gate 632.

In this embodiment, therefore, said AND gate 631 or NOR gate 632 releases an output signal "1" respectively when the output signals of the comparators 21-25 are all "1" or all "0", thus giving an output signal "1" from an OR gate 633. Stated differently the sequence control circuit 63 receives an output signal "1" from said OR gate 633 only when the output signals of the comparators 21-25 are all "1" or all "0".

The signals q1-q5 and q1'-q5' for controlling AND gates 31-35 are supplied from said sequence control circuit 63 instead of the shift register 64, but the basic function is same as explained in the foregoing.

The difference in function of the present embodiment will be clarified in the following. At the start of light measurement the sequence control circuit 63 releases a reset signal RESET to set all the cascade-connected sets of flip-flops 113, 112, 111, 110; 213, 212, 211, 210; . . . ; 513, 512, 511, 510 to a state corresponding to the binary code "1000". At the same time a condition:

$$q1'="1", q2'=q3'=q4'=q5'="0" \tag{3}$$

is reached, so that the output signals from the flip-flops 113-110 are supplied to the digital-analog converter 60. In this state another condition:

$$q1=q2=q3=q4=q5="1" \tag{4}$$

is also established to open all the AND gates 31-35. After a period $t_0$, the sequence control circuit 63 releases a short pulse b3="1" whereby the flip-flops 113, 213, . . . , 513 are maintained in set state or reset according to the output signals from the comparators 21-25. Thus, if the comparators 21-25 provide the same output signals in this state, the OR gate 633 releases an output signal "1" to set the flip-flops 113-110, 213-210, . . . , 513-510 to a state corresponding to a binary code "1100" or "0100" respectively when the analog output signal of the digital-analog converter 60 is smaller or larger than the photoelectric output signal.

The sequence control circuit 63 maintains the aforementioned conditions (3) and (4) during the signal "1" output from the OR gate 633, and releases a short pulse b2="1" after a period $2 \times t_0$, whereby the flip-flops 112, 212, . . . , 512 are maintained in the set state or are reset according to the output signals from the comparators 21-25. More specifically, each group of flip-flops 113-110, 213-210, ... and 513-510 is set to "1010" or "1110" if it is previously in a state of "1100" when b3="1",or to "0110" or "0010" if it is previously in a state of "0100" when b3="1".

In this manner the analog-digital conversion is conducted simultaneously if the photoelectric output signals are at the same level. If this situation becomes no longer valid at the second bit of the flip-flops, the function of the circuit changes in the following manner.

In case at least one of the comparators 21-25 provides different output signal, the OR gate 633 releases an output signal "0", whereby the sequence control circuit 63 determines the conditions:

$$q1'="1", q2'=q3'=q4'=q5'="0" \tag{3}$$

$$q1="1", q2=q3=q4=q5="0" \tag{1}$$

to open the AND gate 31 alone.

After a period $3 \times t_0$, the sequence control circuit 63 releases a short pulse b1="1", and the flip-flop 111 is maintained in the set state or is reset according to the output signal from the comparator 21. Subsequently the the sequence control circuit 63 establishes the conditions:

$$q2="1", q3=q4=q5=q1="0" \tag{2}$$

$$q2'="1", q3'=q4'=q5'=q1'="0" \tag{5}$$

to set or reset the flip-flop 211. Then established are the conditions:

$$q3="1", q4=q5=q1=q2="0" \tag{6}$$

$$q3'="1", q4'=q5'=q1'=q2'="0" \tag{7}$$

to set or reset the flip-flop 311. Upon completion of the setting or resetting of the flip-flops 111-511 in the vertical column in this manner, the setting or resetting of the flip-flops 110-510 in the neighboring column is then conducted.

In the above-explained case, the analog-digital conversion of five photoelectric output signals requires a period of $12 \times t_0$, which is reduced almost to half in comparison with the case of FIG. 6 requiring a period of $5 \times 4t_0 = 20t_0$. This period will be further shortened for an object with a smaller distribution in luminance.

Figure 8:
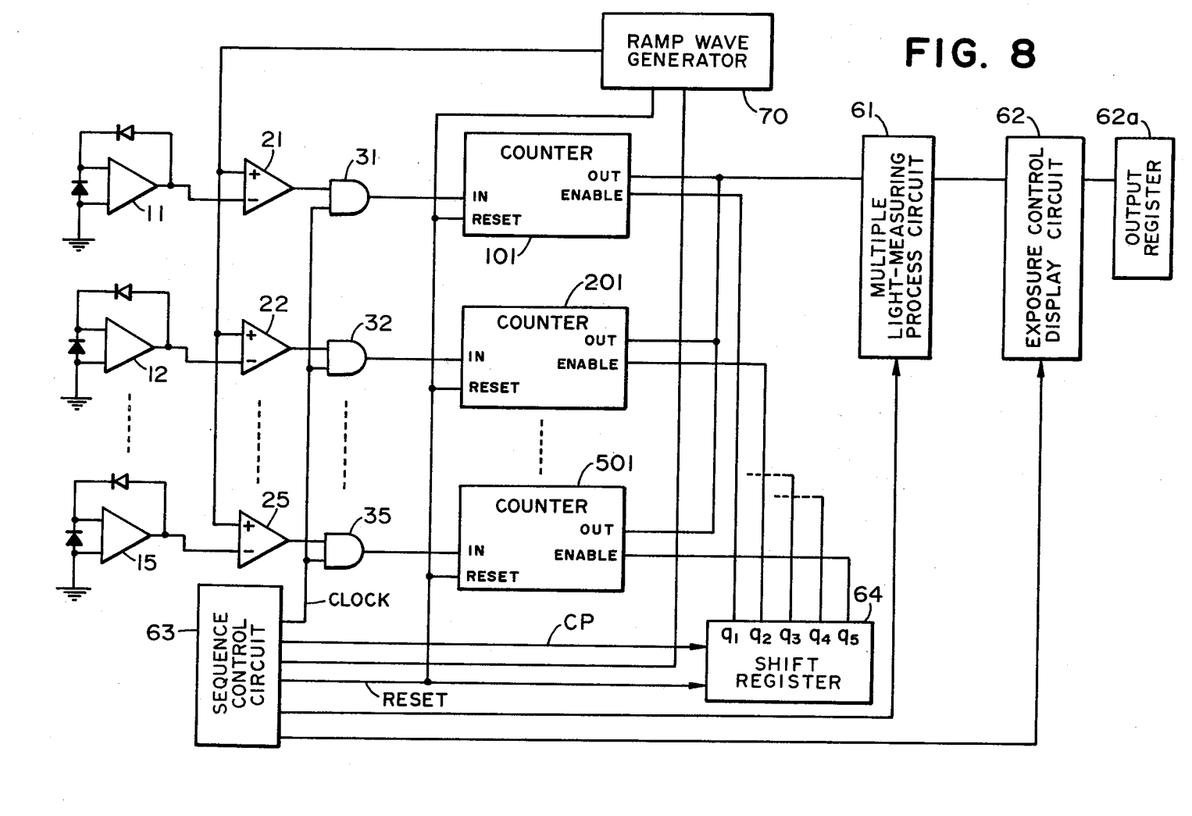
FIG. 8 is a circuit diagram of a fourth embodiment of the present invention.
Figure 9A:
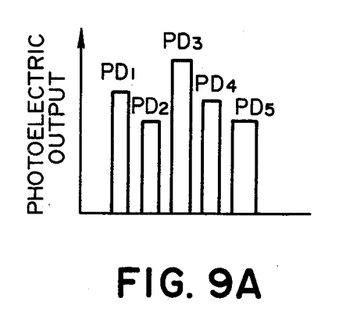
FIGS. 9A, 9B and 9C are charts showing the function of the fourth embodiment of the present invention.
Figure 9B:
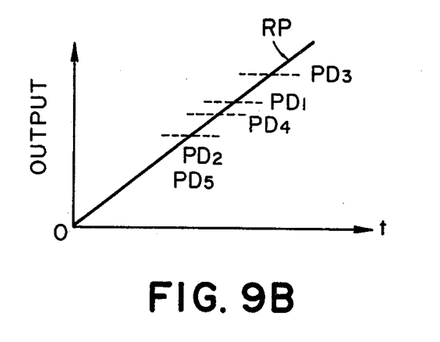

FIG. 8 shows still another embodiment employing integrators as the analog-digital converters, wherein a ramp wave generator 70 generates, in response to a control signal from the sequence control circuit 63, an output signal linearly increasing in time as shown in FIG. 9B for the comparators 21-25.

The AND gates 31-35 receive clock pulses CLOCK from said sequence control circuit 63. Counters 101, 201, . . . , 501, each composed of a set of flip-flops, are activated in succession by receiving signals q1–q5 at the enable ports thereof from the shift register 64 to supply the output signals to the multiple light-measuring process circuit.

It is now assumed that the head amplifiers 11–15 provide photoelectric output signals as shown in FIG. 9A. At first the sequence control circuit 63 releases a reset signal to bring the counters 101–501 to a state corresponding to a binary code "0000" and to bring the output of the ramp wave generator 70 to zero.

Since the photoelectric output signals are larger in this state, the comparators 21–25 generate output signals "1" to enable entry of clock pulses to said counters from the sequence control circuit 63.

Figure 9C:
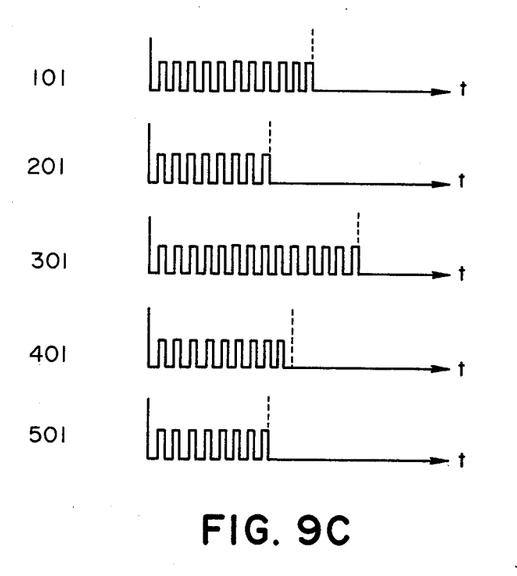

After said reset pulse, the output of the ramp wave generator 70 starts to increase as shown in FIG. 9B in response to a signal from the sequence control circuit 63. Each of the comparators 21–25 changes the output signal to "0" when the photoelectric output signal is exceeded by said output of the ramp wave generator 70, whereby the corresponding AND gate changes the output signal to "0" to forbid the entry of clock pulses to the counter, thus terminating the counting operation thereof. As the result each counter records a count corresponding to the photoelectric output as shown in FIG. 9C.

Figure 10:
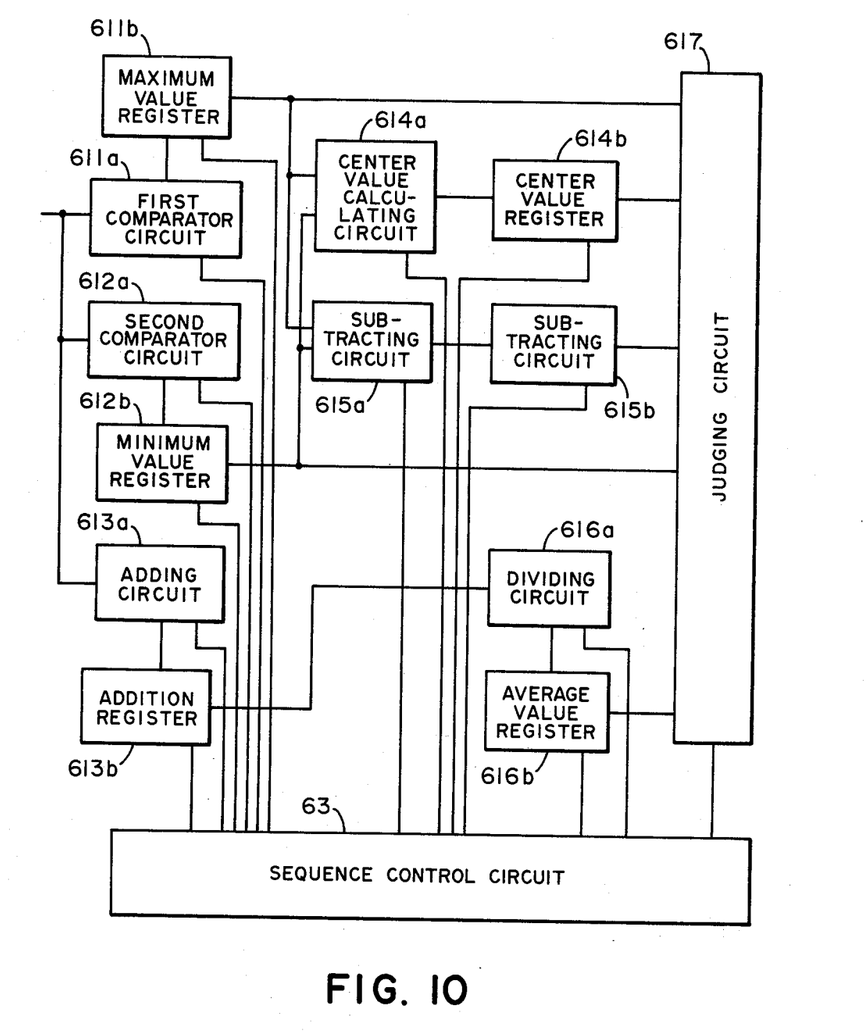
FIG. 10 is a block diagram of a multiple lightmeasuring and processing circuit.

Now FIG. 10 shows the multiple light-measuring process circuit 61 in a block diagram, wherein a first comparator circuit 611a compares the content of a maximum value register 611b and the photoelectric output signal supplied by the sequence control circuit 63 and stores the larger signal in said maximum value register 611b.

Also a second comparator circuit 612a compares the content of a minimum value register 612b with the photoelectric output signal supplied by the sequence control circuit 63 and stores the smaller signal in said minimum value register 612b.

An adding circuit 613a adds the content of an addition register 613a with the photoelectric output signal supplied by the sequence control circuit 63 and stores the result of said addition in said addition register 613b.

Upon completion of the analog-digital conversion, the sequence control circuit 63 clears the registers 611b, 613b, 614b, 615b and 616b and enters a binary code "1111" into said minimum value register 612b. Subsequently the sequence control circuit 63 causes the successive supply of the photoelectric output signals stored in the successive comparing registers 100–500 or in the counters 101–501 to conduct the above-explained functions, whereby, upon completion of said signal supply, the maximum value register 611b stores the maximum value Pmax of the photoelectric output signals while the minimum value register 612b stores the minimum value Pmin of said output signals. Also the addition register 613b stores the total sum of the photoelectric output signals.

A center value calculating circuit 614a calculates the sum of the output Pmax of said maximum value register 611b and of the output Pmin of said minimum value register 612b followed by division by 2 to obtain the center value (Pmax+Pmin)/2 which is stored in a center value register 614b.

Also a subtracting circuit 615a subtracts the output Pmin of the minimum value register 612b from the output Pmax of the maximum value register 611b to obtain a luminance difference (Pmax−Pmin) which is stored in a luminance difference register 615b.

Also a dividing circuit 616a divides the total sum of the photoelectric output signals stored in the addition register 613b by the number of photosensor elements to obtain an average value, which is stored in an average value register 616b.

Finally a judging circuit 617 performs the aforementioned judgements and calculates the appropriate exposure in response to the values Pmax, Pmin, (Pmax+Pmin)/2, Pmax−Pmin, and Pmean stored in the above-mentioned registers 611b, 612b, 614b, 615b and 616b.

We claim:

1. A light measuring device capable of measuring an object field divided into a plurality of areas, comprising:
   light sensitive means for photometering said plurality of areas individually for generating a corresponding plurality of photometering analog signals;
   means for converting said photometering analog signals to corresponding digital outputs; and
   processing means responsive to said digital outputs for performing calculations dependent upon the brightness of said object field;
   said converting means comprising a plurality of comparator means for comparing said photometering analog signals, respectively, with reference analog signals, a plurality of digital storage means for storing digital signals dependent upon outputs from said comparator means, respectively, a single device for producing said analog reference signals for all of said comparator means, and control means for controlling the storage of said digital signals in said digital storage means and for controlling the application of digital outputs from said digital storage means to said processing means.

2. A light measuring device in accordance with claim 1, wherein said single device is a digital-to-analog converter and said digital storage means comprise a plurality of registers.

3. A light measuring device in accordance with claim 2, wherdin said outputs of said comparator means are connected to inputs of said registers, respectively, by gate means, respectively, controlled by said control means, 4. A light measuring device in accordance with claim 2, wherein said control means comprises means for applying digital signals stored in different ones of said registers as a digital input to said digital-to-analog converter at different times.

5. A light measuring device in accordance with claim 2, wherein said control means comprises means for applying digital signals stored in said registers as a digital input to said digital-to-analog converter in sequence.

6. A light measuring device in accordance with claim 2, wherein said control means comprises means for applying a series of digital signals stored at different times in each register as a digital input to said digital-to-analog converter at said different times.

7. A light measuring device in accordance with claim 2, wherein said control means comprises means for connecting inputs of all of said registers to receive outputs from the respective comparator means concurrently, and thereafter, depending upon the outputs of said comparator means, connecting the input of only one of said registers to the respective comparator means.

8. A light measuring device in accordance with claim 1, wherein said single device comprises a ramp wave generator and said digital storage means comprise counters, and wherein said control means comprises means for connecting outputs of said counters to said processing means in sequence.

* * * * *